(12) United States Patent
Radu et al.

(10) Patent No.: US 7,299,892 B2
(45) Date of Patent: Nov. 27, 2007

(54) DOOR TRIM SPEAKER GRILLE WITH ELECTROLUMINESCENT LAMP AND INJECTION MOLDING METHOD OF MAKING SAME

(75) Inventors: Bogdan Radu, Dearborn, MI (US); Alan G Dry, Grosse Point Woods, MI (US); David Dooley, Troy, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 258 days.

(21) Appl. No.: 10/711,463

(22) Filed: Sep. 20, 2004
(Under 37 CFR 1.47)

(65) Prior Publication Data
US 2006/0060415 A1   Mar. 23, 2006

(51) Int. Cl.
*H04R 1/02*   (2006.01)
*G09F 27/00*   (2006.01)
*B60Q 1/076*   (2006.01)
*B60Q 5/00*   (2006.01)

(52) U.S. Cl. ............... 181/150; 181/141; 381/386; 381/388; 381/86; 381/124; 362/86; 362/501

(58) Field of Classification Search ............... 181/150, 181/141; 381/386, 388, 86, 124; 362/86, 362/501
See application file for complete search history.

(56) References Cited

U.S. PATENT DOCUMENTS

| | | | | |
|---|---|---|---|---|
| 2,083,753 A * | 6/1937 | Turner | ............. | 181/155 |
| 2,851,585 A | 9/1958 | Glowzinski | ............. | 240/2 |
| 4,104,555 A | 8/1978 | Fleming | | |
| 4,602,358 A | 7/1986 | Sato | ............. | 369/12 |
| 4,619,624 A | 10/1986 | Kerr, III et al. | ............. | 445/22 |
| 4,670,819 A | 6/1987 | Boerema et al. | ............. | 362/80 |
| 4,875,143 A * | 10/1989 | Fernandez | ............. | 362/86 |
| 5,013,967 A | 5/1991 | Hirotaka et al. | | |
| 5,064,974 A | 11/1991 | Vigneau et al. | ............. | 200/61.62 |
| 5,158,353 A | 10/1992 | Kimisawa | | |
| 5,193,895 A | 3/1993 | Naruke et al. | | |

(Continued)

FOREIGN PATENT DOCUMENTS

DE     4141297     6/1993

(Continued)

OTHER PUBLICATIONS

DIPL.-ING. Gottstein, German Patent and Trademark Office, Office Action Dated Aug. 2, 2006 in related German Application No. 10 2005 052 533.4 (4 pages).

(Continued)

*Primary Examiner*—Lincoln Donovan
*Assistant Examiner*—Jeremy Luks
(74) *Attorney, Agent, or Firm*—Wood, Herron & Evans, LLP

(57) ABSTRACT

A door trim speaker grille with an electroluminescent lamp for use with an audio speaker of a vehicle. The electroluminescent lamp is positioned for emitting visible light through sound passages in the speaker grille. In certain embodiments of the invention, the electroluminescent lamp may be integrally molded with the speaker grille. One method of forming the door trim speaker grille is by an injection molding process that places the electroluminescent lamp as an insert in the mold cavity.

5 Claims, 3 Drawing Sheets

U.S. PATENT DOCUMENTS

| | | | |
|---|---|---|---|
| 5,434,013 A | 7/1995 | Fernandez | 428/690 |
| 5,434,757 A | 7/1995 | Kashiwagi | 362/80 |
| 5,452,190 A | 9/1995 | Priesemuth | 362/255 |
| 5,780,965 A | 7/1998 | Cass et al. | 313/506 |
| 5,811,930 A | 9/1998 | Krafcik et al. | 313/510 |
| 6,000,493 A * | 12/1999 | Chen | 181/141 |
| 6,000,822 A | 12/1999 | Polizzi et al. | 362/488 |
| 6,013,956 A | 1/2000 | Anderson, Jr. | 307/10.1 |
| 6,116,672 A | 9/2000 | Cannon et al. | 296/37.13 |
| 6,139,304 A | 10/2000 | Centofante | 425/121 |
| 6,158,869 A * | 12/2000 | Barnes, Jr. | 362/86 |
| 6,160,475 A | 12/2000 | Hornung et al. | 340/461 |
| 6,193,399 B1 | 2/2001 | Hulse | 362/511 |
| 6,196,606 B1 | 3/2001 | McGoldrick | 296/37.13 |
| 6,217,201 B1 | 4/2001 | Hulse | 362/511 |
| 6,270,229 B1 * | 8/2001 | Chien | 362/84 |
| 6,286,983 B1 | 9/2001 | Macher et al. | 362/487 |
| 6,315,436 B1 | 11/2001 | Schenk et al. | 362/488 |
| 6,419,379 B1 | 7/2002 | Hulse | 362/488 |
| 6,464,381 B2 * | 10/2002 | Anderson et al. | 362/488 |
| 6,536,825 B2 | 3/2003 | McAndrew et al. | 296/37.13 |
| 6,536,928 B1 | 3/2003 | Hein et al. | 362/464 |
| 6,545,418 B1 * | 4/2003 | Kolpasky et al. | 315/77 |
| 6,594,417 B1 | 7/2003 | Hulse | 385/31 |
| 6,641,276 B1 | 11/2003 | Macher et al. | |
| 6,652,128 B2 | 11/2003 | Misaras | 362/488 |
| 6,656,397 B1 | 12/2003 | Hansen et al. | 264/45.4 |
| 6,746,067 B2 | 6/2004 | Schmidt et al. | 296/37.13 |
| 6,786,614 B2 | 9/2004 | Ciarrocchi, Jr. | |
| 6,945,581 B2 | 9/2005 | Taylor | 296/37.8 |
| 7,156,437 B2 | 1/2007 | Cowelchuk et al. | |
| 2001/0030871 A1 | 10/2001 | Anderson, Jr. et al. | 362/488 |
| 2001/0053082 A1 | 12/2001 | Chipalkatti et al. | 362/496 |
| 2003/0002273 A1 | 1/2003 | Anderson, Jr. et al. | 362/84 |
| 2003/0031330 A1* | 2/2003 | Kim | 381/111 |
| 2003/0048912 A1* | 3/2003 | Reich | 381/124 |
| 2004/0017687 A1 | 1/2004 | Misaras | 362/489 |
| 2004/0108606 A1 | 6/2004 | Goggins | |
| 2004/0175014 A1* | 9/2004 | Liu | 381/386 |
| 2005/0002199 A1* | 1/2005 | Stuffle et al. | 362/487 |
| 2005/0140167 A1 | 6/2005 | Jaggi | |
| 2006/0271261 A1 | 11/2006 | Flores et al. | |

FOREIGN PATENT DOCUMENTS

| | | |
|---|---|---|
| DE | 19518169 | 11/1996 |
| DE | 29719025 | 12/1997 |
| DE | 298 0 949 U1 | 7/1998 |
| DE | 199 10 973 | 10/2000 |
| DE | 10010088 | 6/2001 |
| DE | 10129021 | 9/2002 |
| DE | 101 51 704 | 10/2003 |
| DE | 10240270 | 3/2004 |
| DE | 20 2004 002 786 U1 | 6/2004 |
| DE | 103 16 678 B3 | 8/2004 |
| DE | 10316678 B3 * | 8/2004 |
| DE | 10314352 A1 | 10/2004 |
| DE | 10335868 | 3/2005 |
| DE | 10338898 | 3/2005 |
| DE | 10341253 A1 | 4/2005 |
| DE | 60012295 T2 | 8/2005 |
| DE | 202005009668 | 10/2005 |
| EP | 1298007 | 4/2003 |
| EP | 1 188 615 A3 | 6/2004 |
| EP | 1110822 B1 | 7/2004 |
| EP | 1448027 A1 * | 8/2004 |
| FR | 2838669 | 10/2003 |
| JP | 57194126 | 11/1982 |
| JP | 9086273 | 3/1997 |
| JP | 9097026 | 4/1997 |
| JP | 11162633 | 6/1999 |
| JP | 2000344011 | 12/2000 |
| JP | 2002046529 | 2/2002 |
| JP | 2002096691 A | 4/2002 |
| JP | 2003086354 | 3/2003 |
| WO | WO 98/57097 | 12/1998 |
| WO | WO 01/63172 | 8/2001 |
| WO | 03101779 A2 | 12/2003 |

OTHER PUBLICATIONS

DIPL.-ING. Gottstein, German Patent and Trademark Office, Office Action Dated Aug. 2, 2006 in related German Application No. 10 2005 052 534.2-42 (3 pages).

DIPL.-ING. Univ. Stefan Geisenberger, German Patent and Trademark Office, Office Action Dated Jun. 7, 2006 (3 pages).

Friedhofer, Michael A., United States Patent and Trademark Office, Office Action Mailed Jun. 27, 2006 in related U.S. Appl. No. 10/711,385.

Truong, Bao Q., United States Patent and Trademark Office, Office Action Mailed Jun. 23, 2006 in related U.S. Appl. No. 10/711,480.

United States Patent and Trademark Office, Notice of Allowance and Fee(s) Due mailed May 25, 2006 in related U.S. Appl. No. 10/711,636.

DIPL.-ING. Ropling; German Patent and Trademark Office, Office Action dated May 18, 2006 (4 pages).

United States Patent and Trademark Office, Office Action mailed May 9, 2006 in related U.S. Appl. No. 10/711,462.

German Patent Office, Office Action mailed May 5, 2006 in corresponding German Application No. 10 2005 043 901.2-42 to related U.S. Appl. No. 10/711,385.

United States Patent and Trademark office, Office Action mailed Jan. 19, 2006 in related U.S. Appl. No. 10/711,462.

United States Patent and Trademark Office, Office Action mailed Dec. 23, 2005 in related U.S. Appl. No. 10/711,385.

European Patent Office, Search Report issued in Corresponding Application No. GB0521216.2, Date of Search: Mar. 27, 2006.

German Patent Office, *Office Action Dated* Sep. 21, 2005, Untranslated (4 pages).

The UK Patent Office, *Search Report Issued in GB0518067.4*, Date of Search: Nov. 29, 2005.

The UK Patent Office, *Search Report from GB0518379.3*, Date of Search: Nov. 24, 2005.

The UK Patent Office, *Search Report from GB0521213.9*, Date of Search: Jan. 18, 2006.

The UK Patent Office, *Search Report issued in GB0521210.5*, Date of Search: Jan. 20, 2006.

The UK Patent Office, *Search Report Issued in GB0518374.4*, Date of Search: Dec. 1, 2005.

Bogdan Radu et al., U.S. Appl. No. 10/711,636, filed Sep. 29, 2004.
Bogdan Radu et al., U.S. Appl. No. 10/711,652, filed Sep. 29, 2004.
Bogdan Radu et al., U.S. Appl. No. 10/711,480, filed Sep. 21, 2004.
Bogdan Radu et al., U.S. Appl. No. 10/711,462, filed Sep. 20, 2004.
Bogdan Radu et al., U.S. Appl. No. 10/711,385, filed Sep. 15, 2004.

US Patent and Trademark Office, Office Action issued in related U.S. Appl. No. 10/711,480, filed Nov. 8, 2006.

US Patent and Trademark Office, Office Action issued in related U.S. Appl. No. 10/711,462, filed Dec. 19, 2006.

US Patent and Trademark Office, Office Action issued in related U.S. Appl. No. 10/711,462, filed Oct. 17, 2006.

Examination Report under Section 18(3): dated Sep. 22, 2006; 1 page; UK Patent Office.

* cited by examiner

DOOR TRIM SPEAKER GRILLE WITH ELECTROLUMINESCENT LAMP AND INJECTION MOLDING METHOD OF MAKING SAME

Cross-Reference to Related Applications

This application is related to U.S. Patent application Ser. No. 10/711,385, filed Sep. 15, 2004, now pending in the U.S. Patent and Trademark Office and U.S. Patent application Ser. No. 10/711,462 filed Sep. 20, 2004, now pending in the U.S. Patent and Trademark Office and U.S. Patent Ser. application No. 10/711,480 filed Sep. 21, 2004, now pending in the U.S. Patent and Trademark Office and U.S. Patent application Ser. No. 10/711,636, filed Sep. 29, 2004, now pending in the U.S. Patent and Trademark Office, and U.S. Patent Ser. application No. 10/711,652 filed Sep. 29, 2004, now pending in the U.S. Patent and Trademark Office.

FIELD OF THE INVENTION

The present invention pertains generally to automotive interiors and more particularly to speaker grilles for automotive interiors.

BACKGROUND OF THE INVENTION

Vehicle door constructions typically feature a metal door frame with a sheet metal outer panel or skin that defines the door's exterior and an inner sheet metal panel secured to the door frame. Various door components, including window regulator rails, audio speakers, latches, and the like, are fastened in openings defined in the inner sheet metal panel. Covering the inner door panel is a removable trim panel that provides an aesthetically pleasing facade viewed by occupants seated in the passenger cabin of the motor vehicle. Controls are provided on the trim panel for devices such as seats, door locks, mirror and windows. The door latch is connected by a cable to an inner release handle on the trim panel accessible to the vehicle occupant.

Light emitting sources are positioned at convenient locations inside the vehicle passenger cabin. The light emitting sources are used to illuminate one or more portions of the vehicle interior at strategic times. For example, a light emitting source in the passenger cabin may illuminate the device controls on the door trim panel.

A decorative and protective speaker grille covers the audio speaker and is typically removably attached by a snap fit with the audio speaker. Conventional speaker grilles are not illuminated and, therefore, are not visible to an occupant of the passenger cabin under low-lighting conditions, such as early evening or dusk, and darkness caused by storms during the daytime and the like.

What is needed therefore is a speaker grille construction that improves on conventional speaker grille constructions.

SUMMARY OF THE INVENTION

In an embodiment of the invention, an automotive interior component comprises a door trim panel, a speaker grille mounted to the door trim panel for transmitting sound emitted by an audio speaker of a vehicle door assembly, and an electroluminescent lamp positioned between the audio speaker and said speaker grille. The electroluminescent lamp oriented for emitting visible light, when powered, through sound passages in the speaker grille. In certain embodiments of the invention, the electroluminescent lamp is mounted to, and preferably, integrally molded with the speaker grille.

In another embodiment of the invention, a method is provided for making an automotive interior component in a mold with a pair of half sections that form a mold cavity with a geometrical shape resembling at least a speaker grille and a gate for filling the mold cavity. The method includes placing an electroluminescent lamp between the half sections of the mold, closing the mold half sections, and injecting a molten polymer resin through the gate to fill a portion of the mold cavity unfilled by the electroluminescent lamp. The method further includes opening the mold half sections after the molten polymer resin solidifies and ejecting the automotive interior component having the geometrical shape of at least the speaker grille from the mold.

These and other objects and advantages of the invention shall become more apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
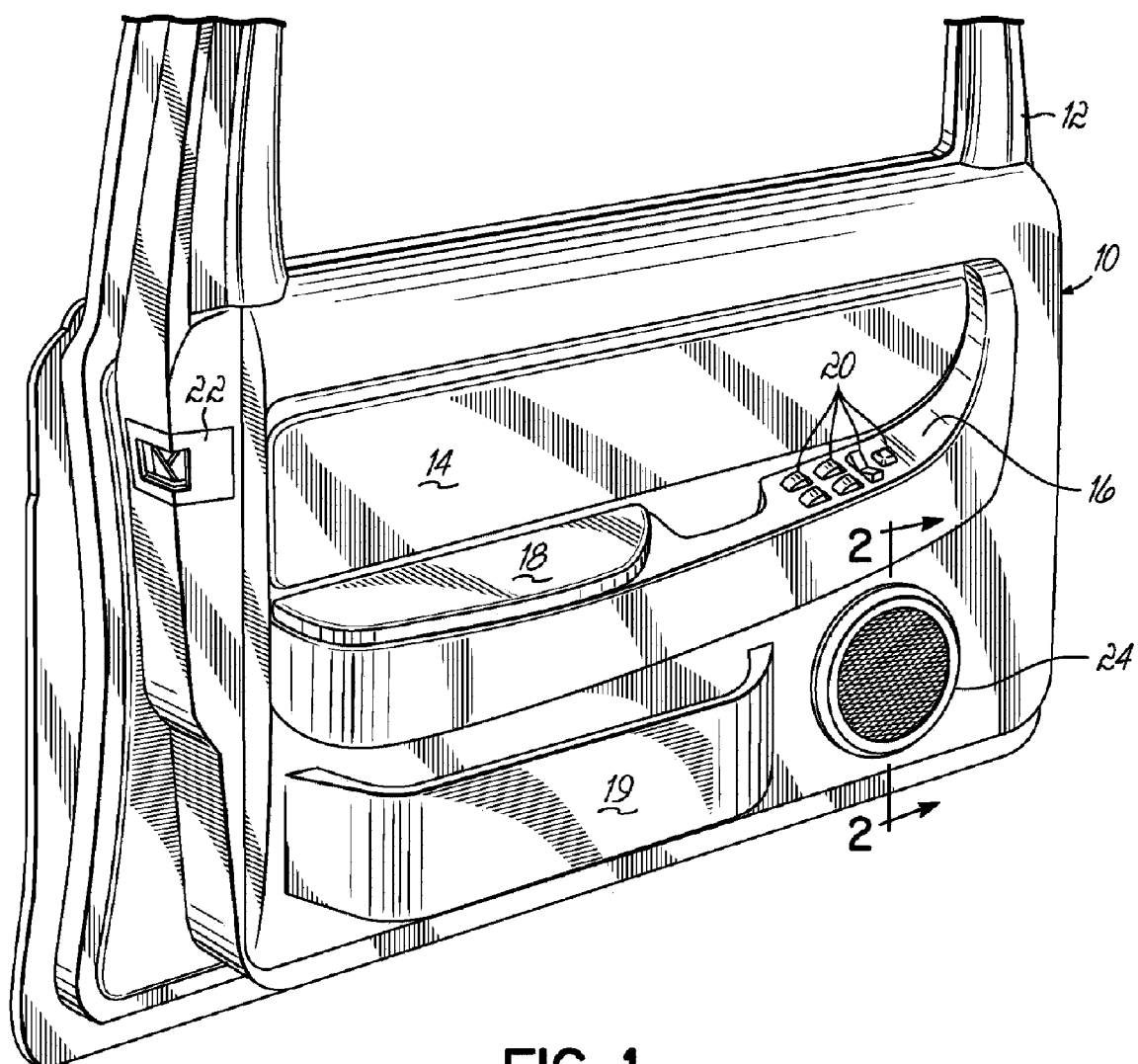
FIG. 1 is a perspective view of a door trim panel fastened to a vehicle door frame and including a speaker grille of the present invention.

With reference to FIG. 1, a door trim panel 10 constructed in accordance with an embodiment of the invention is shown fastened to a door of a vehicle such as, for example, an automobile, a truck, or an aircraft. More specifically, door trim panel 10 is coupled as an assembly with the inner sheet metal of a door frame 12, which has a hinged attachment with a body of an automobile. The trim panel 10 may be attached to the door frame 12 by suitable fasteners (not shown) as is well known in the art. Persons of ordinary skill in the art will appreciate that door trim panel 10 may be used on other door assemblies including but not limited to sliding doors, hatches, etc. Further, persons of ordinary skill in the art will also appreciate that door frame 12 may be constructed of other materials such as composites like fiberglass and carbon fibers. A passenger occupying the passenger cabin of the automobile can manually move the assembled door relative to the body for passenger ingress and egress of the passenger cabin.

The door trim panel 10 includes a bolster 14 covering an access opening to the space between the trim panel 10 and the door frame 12, a switch panel 16, an armrest 18, and a map pocket closeout 19. Control switches 20 in switch panel 16 are electrically coupled by a hidden wiring harness with conventional electrically-operated components such as door locks, window controls, seat controls, and side mirrors of the automobile. An inner door release handle (not shown) for operating a door latch 22 is accessible to a passenger inside the passenger cabin.

Also mounted to the trim panel 10 is a speaker grille 24 that covers an audio speaker 25 (FIG. 2), which is itself mounted to door frame 12. The invention contemplates that, in an alternative embodiment, the speaker grille 24 may comprise an integral portion of the trim panel 10 formed by an injection molding process. The audio speaker 25 further includes a magnet assembly 29 and a diaphragm 31 that cooperate as understood by persons of ordinary skill in the art for converting electrical signals into sound waves.

Figures 2, 2A:
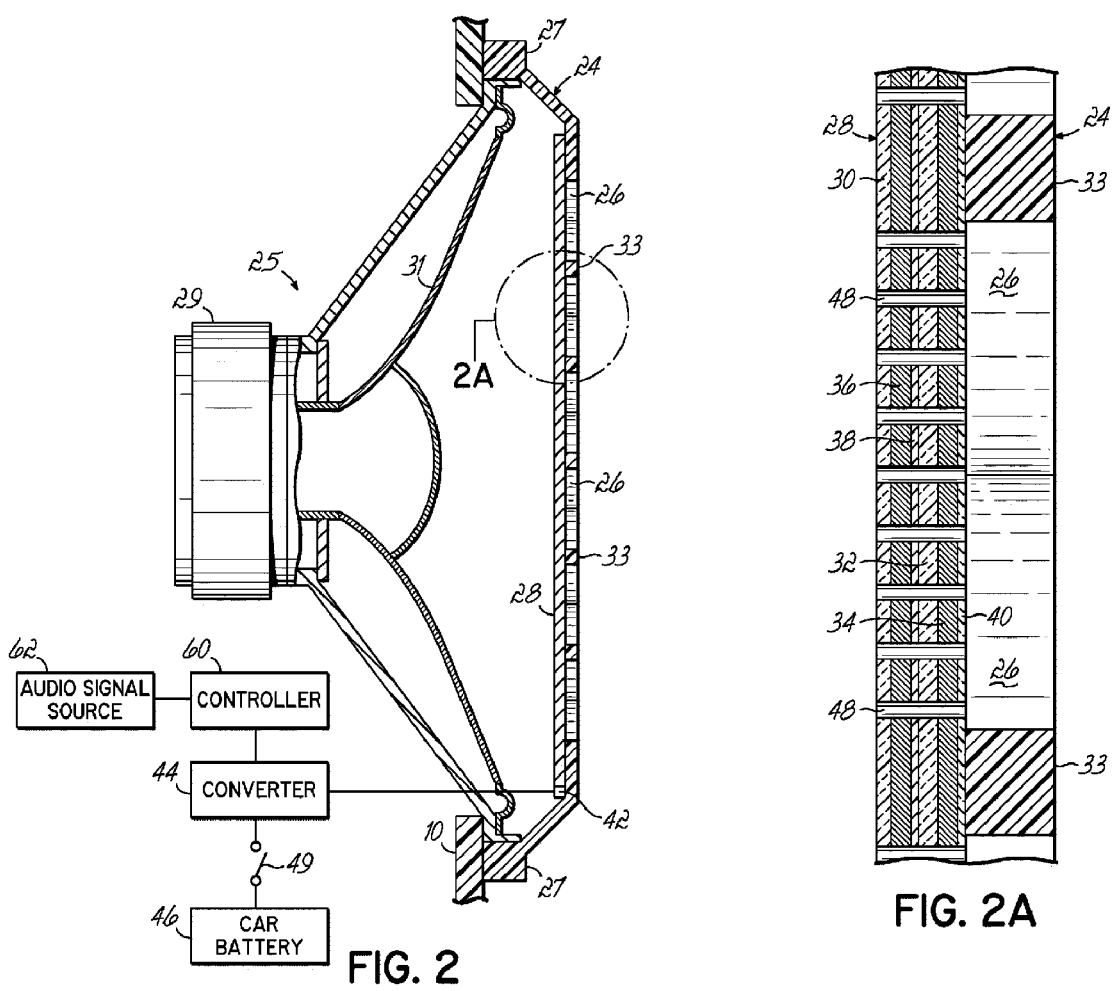
FIG. 2 is a cross-sectional view of the speaker grille of the present invention.
FIG. 2A is a detailed view of a portion of FIG. 2.

With reference to FIGS. 2 and 2A in which like reference numerals refer to like features in FIG. 1, the speaker grille 24 has a plurality of sound passages 26 extending between front and rear grille surfaces and may include an optional speaker bezel 27 encircling the outer perimeter of speaker grille 24. The sound passages 26 are defined within the central cutout of the bezel 27. The sound passages 26 may have any conventional cross-sectional profile when viewed from a perspective parallel to the passage centerline. The sound passages 26 are defined by interlaced cross members 33 crossing the central cutout of the bezel 27.

Disposed between the audio speaker 25 and the speaker grille 24 is an electroluminescent (EL) lamp 28 that consists of a stacked structure of multiple layers carried on a suitable flexible structural substrate 30. The layered structure includes a layer of an EL phosphor 32 disposed between substantially parallel front and rear electrodes 34 and 36, respectively. The phosphor layer 32 is contiguous with the front electrode 34 but spaced from, and electrically isolated from, the rear electrode 36 by a dielectric layer 38. The front electrode 34, which faces into the interior of the passenger compartment, is light transmissive (i.e., transparent or translucent) for transmitting light emitted from the phosphor layer 32 when an electric field is applied between the front and rear electrodes 34, 36. The dielectric layer 38 may be pigmented to supply a dark or colored background for the emitted light.

A protective encapsulation layer 40 of a light-transmissive substance, such as polycarbonate or another polymer suitable for this application, optionally covers the front electrode 34 of the EL lamp 28. The encapsulation layer 40 may be applied to the stacked structure as a printed ink layer. An electrical connector 42, such as an edge electrical connector, includes power contacts that are coupled with the front and rear electrodes 34, 36. The power contacts of the electrical connector 42 are exposed through the encapsulation layer 40 for establishing electrical contacts.

The layers of the EL lamp 28 may be printed onto the substrate by rotary screen printing, flexographic printing, or other printing methods using conducting, insulating and electroluminescent ink compositions. The ink compositions are printed across a desired print area on the substrate 30, or alternatively on the encapsulation layer 40, and then dried to remove volatile solvents for forming stable layers. Some of the layers in the stacked structure may be printed more than once in order to assure proper thickness.

Phosphor ink compositions are available to emit light in many colors, such as green, blue, and yellow, and may also be blended to produce white or colored light emission. Typical EL phosphors for EL lamp 28 are comprised of inorganic zinc sulfide-based materials doped to create the desired color emission. Suitable EL phosphor ink compositions include white, blue-green and yellow-green LUX-PRINT® electroluminescent inks commercially available from DuPont Microcircuit Materials (Research Triangle Park, N.C.).

In one embodiment of the invention, a flexible metallized film may effectively function as the substrate 30, the rear electrode 36 and the dielectric layer 38 of the EL lamp 28. Such metallized films include a thin layer of a metallic conductive material, like aluminum, deposited on one side of a film material, like polyester. The deposited metallic layer operates as the rear electrode 36 and the film material acts as the dielectric layer 38. The metallized film also serves as a substrate 30 for application of the remaining printed component layers (e.g., phosphor layer 32 and front electrode 34) of the stacked structure.

An inverter or converter 44 electrically couples a direct current (DC) electrical system of the vehicle, which includes the car battery 46, with the electrical connector 42. The converter 44 converts the DC voltage from the electrical system to generate an alternating current (AC) driving voltage in the range of 80 to 200 VAC, preferably about 110 VAC, at a frequency in the region of 300 to 500 Hz, preferably about 400 Hz. Additional circuitry, as recognized by persons of ordinary skill in the art, may be provided as required to ensure proper operation of the EL lamp 28. Application of the AC driving voltage across the front and rear electrodes 34, 36 of the EL lamp 28 generates a varying electric field within the phosphor layer 32 causing the constituent phosphor particles to emit visible light. In general, the brightness of the EL lamp 28 increases with increased voltage and frequency. Power to the EL lamp 28 may be switched, for example, in coordination with operation of a light switch 49 controlling vehicle lighting or with operation of the audio system of the automobile.

The EL lamp 28 includes apertures 48 registered with the sound passages 26 in the speaker grille 24 so that sound can be transmitted from the audio speaker 25 into the passenger cabin. At the same time, portions of EL lamp 28 surrounding apertures 48 are visible through the passages 26, which are significantly larger than apertures 48, so that visible light emitted by the EL lamp 28 is visible through the speaker grille 24.

The EL lamp 28 is mounted to the speaker grille 24 and, preferably, is integrally molded with the polymer body defining the speaker grille 24. However, the invention is not so limited as the EL lamp 28 may be mounted instead, for example, to the audio speaker 25 or to the portion of the trim panel 10 surrounding the opening for the speaker.

In an alternative embodiment of the invention, the EL lamp 28 may be incorporated into the speaker bezel 27 and positioned so that the visible light emitted light illuminates encircling the outer perimeter of speaker grille 24. In yet another alternative embodiment, the polymer forming the speaker bezel 27 may be transparent or translucent and the EL lamp 28 positioned to emit light outwardly into the passenger cabin through the bezel 27.

The EL lamp 28 advantageously features a low power consumption and very low heat generation, as compared with conventional lamps commonly used in these and other automotive applications. Furthermore, the EL lamp 28 is sturdy and exhibits excellent vibration and impact resistance. The EL lamp 28 will have a lengthy life and, as a result, will not routinely need replacement over the life of the automobile, in contrast to the need to periodically replace burnt-out conventional incandescent bulbs. The resin material forming the speaker grille 24 need not be heat resistant as the EL lamp 28 has a cooler operating temperature than conventional incandescent bulbs.

Figure 3:
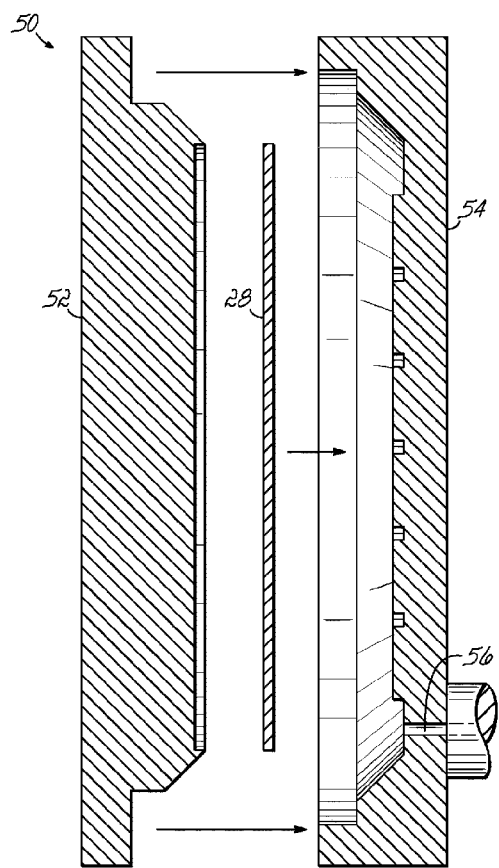
FIGS. 3-5 are diagrammatic cross-sectional views illustrating a molding process for forming the speaker grille of the present invention.
Figure 4:
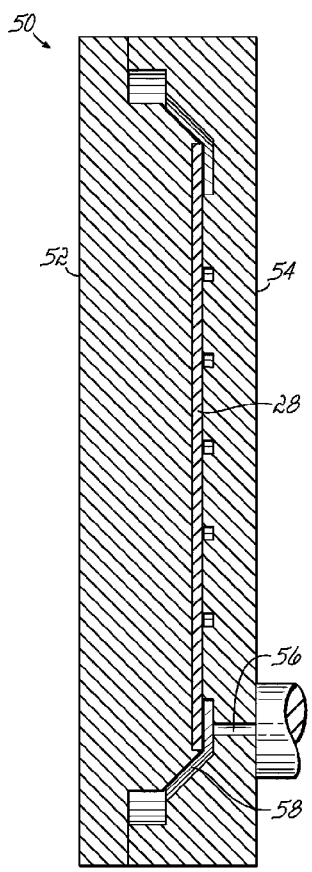
Figure 5:
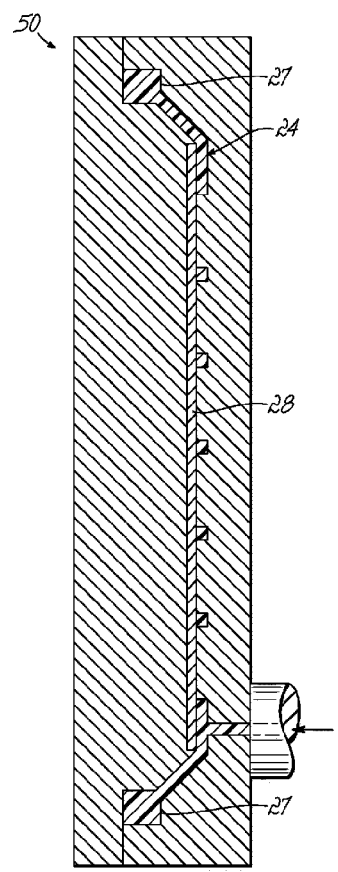

With reference to FIGS. 3-5, a method of making the trim panel 10 will be described that illustrates a processing sequence in which the EL lamp 28 is integrally injection molded in a mold cavity 58 with the speaker grille 24. Alternatively, the shape of the mold cavity 58 and the EL lamp 28 may be altered for molding the EL lamp 28 into the speaker bezel 27.

In FIG. 3, an injection die or mold 50 having first and second mold sections 52, 54 is provided. The EL lamp 28 is placed at a specified location between the first and second mold sections 52, 54 so that the power contacts of the electrical connector 42 (FIG. 2) are exposed after molding for establishing electrical contacts. As shown in FIG. 4, the mold 50 is closed so that the first and second mold sections 52, 54 define the mold cavity 58 having the general three-dimensional geometrical shape of the speaker grille 24.

As shown in FIG. 5, molten resin material is injected by an extruder through one or more gates 56 into the mold cavity 58 and fills the space inside the cavity 58 not occupied by the EL panel 28. The synthetic resin material is selected according to the characteristics required for the speaker grille 24 and may be any engineering polymer material suitable for an injection molding process. The injection molding process creates sufficient pressure and heat to bond the EL lamp 28 and the injected molten resin material to form the speaker grille 24 as an integral structure. The mold 50 is opened by separating the mold sections 52, 54 and the speaker grille 24 is ejected from the mold 50 in a condition ready for delivery as a unitary component to a door assembly location of an automotive production line.

If necessary, the speaker grille 24 may then either be partially or completely vacuum- or thermo-formed to achieve a final desired shape. In this regard, the shape of the mold cavity 58 may not reflect the three-dimensional geometrical shape of the speaker grille 24 as such post injection molding processes may be used to form the final shape.

The invention also contemplates that the article formed by the injection molding process may be the entire trim panel 10 with an integral speaker grille 24 that includes the EL lamp 28. In this embodiment, the three-dimensional geometrical shape of the mold cavity 58 will reflect that of the trim panel 10 or a post injection molding process is used to shape the molded article to form the final shape of trim panel 10.

With renewed reference to FIG. 2, the EL lamp 28 may be connected by a controller 60 with an audio signal source 62, such as the vehicle stereo system. The controller 60, which is interfaced with the converter 44, varies the light emission of the EL lamp 28 (e.g., brightening, darkening, or flashing) in response to the output signals from the audio signal source 62. The occupants of the passenger cabin are provided with a visual display from the speaker grille 24 characterized by periodic changes in light intensity synchronized with variations in the output signals from the audio signal source 62 and, therefore, synchronized with the audible sound heard by the occupants.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. An automotive interior component for use with an audio speaker of a vehicle, comprising:
   a door trim panel;
   a speaker grille mounted to said door trim panel, said speaker grille with a plurality of sound passages for transmitting sound emitted by the audio speaker; and
   an electroluminescent lamp positioned between the audio speaker and said speaker grille, said electroluminescent lamp oriented for emitting visible light, when powered, through said sound passages, wherein said speaker grille and said electroluminescent lamp comprise a unitary molded assembly.

2. The automotive interior component of claim 1 wherein said electroluminescent lamp includes a plurality of apertures registered with said sound passages, said apertures for transmitting sound emitted by the audio speaker.

3. The automotive interior component of claim 2 wherein said apertures are smaller in diameter than said sound passages and circumscribed by said sound passages.

4. The automotive interior component of claim 1 wherein said speaker grille is an integrally molded portion of said trim panel.

5. The automotive interior component of claim 1 further comprising:
   an audio signal source coupled with the audio speaker; and
   a controller connected between said audio signal source and said electroluminescent lamp, said controller capable of converting output signals from said audio signal source into changes in light intensity of the visible light emitted from said electroluminescent lamp.

* * * * *